United States Patent
Trussell

(10) Patent No.: US 10,505,289 B1
(45) Date of Patent: Dec. 10, 2019

(54) PORTABLE WELDING GROUND CLAMP ATTACHMENT SYSTEMS

(71) Applicant: Christopher Bryan Trussell, Edgewood, TX (US)

(72) Inventor: Christopher Bryan Trussell, Edgewood, TX (US)

(*) Notice: Subject to any disclaimer, the term of this patent is extended or adjusted under 35 U.S.C. 154(b) by 88 days.

(21) Appl. No.: 15/453,530

(22) Filed: Mar. 8, 2017

Related U.S. Application Data

(63) Continuation of application No. 14/229,942, filed on Mar. 30, 2014, now abandoned.

(60) Provisional application No. 61/807,678, filed on Apr. 2, 2013.

(51) Int. Cl.
*H01R 4/48* (2006.01)
*B23K 9/32* (2006.01)

(52) U.S. Cl.
CPC ............. *H01R 4/48* (2013.01); *B23K 9/321* (2013.01)

(58) Field of Classification Search
CPC .......... B23K 37/0436–37/443; B23K 37/053–37/0538; B25B 5/00; B25B 5/147; B25B 13/5008; B25B 13/5016; B25B 13/5025; B25B 13/5058; H01R 4/64
USPC ...... 228/24.1–49.3; 81/489, 177.1; 269/3, 6, 269/95; 29/271, 278, 261, 267
See application file for complete search history.

(56) References Cited

U.S. PATENT DOCUMENTS

| | | | |
|---|---|---|---|
| 2,429,526 A | * | 10/1947 | Savon .................... H01R 11/30 219/136 |
| D162,910 S | | 4/1951 | Wallace |
| 3,653,115 A | | 4/1972 | Ralph |
| 4,132,397 A | | 1/1979 | Ward |
| D266,274 S | | 9/1982 | Ams |
| D284,348 S | | 6/1986 | Covey |
| 4,598,452 A | | 7/1986 | Iseki |
| 4,792,129 A | * | 12/1988 | LePrevost, Jr. ........... B25B 5/10 269/156 |
| 4,828,241 A | * | 5/1989 | Yang ....................... B25B 5/003 269/114 |
| 5,206,980 A | | 5/1993 | Chapman |
| 5,593,147 A | | 1/1997 | Read |
| D399,111 S | | 10/1998 | Budesa |
| 5,865,269 A | | 2/1999 | Eskesen |
| D414,669 S | | 10/1999 | Howard |
| D439,820 S | | 4/2001 | Yang |
| 6,279,885 B1 | | 8/2001 | Leon |
| 6,412,157 B1 | | 7/2002 | Gray |
| D607,706 S | | 1/2010 | Jastrow |

(Continued)

OTHER PUBLICATIONS

Lincoln Electric, Grasshopper Holding Device, http://www.lincolnelectric.com/en-us/supportlwelding-projects/Pages/grasshopper-holding-device.aspx (last visited May 8, 2013), Internet web site, date of first publication unknown.

(Continued)

*Primary Examiner* — David P Bryant
*Assistant Examiner* — Nirvana Deonauth
(74) *Attorney, Agent, or Firm* — Volk & McElroy, LLP; Michael D. Volk, Jr.

(57) ABSTRACT

A portable welding ground clamp attachment system used to attach a welding ground clamp (also called a work clamp or work cable) of an arc welder to a workpiece to be welded. The system is particularly useful in establishing positive connections between a work cable and extended lengths of pipe.

4 Claims, 9 Drawing Sheets

(56) References Cited

U.S. PATENT DOCUMENTS

| | | |
|---|---|---|
| 8,087,138 B2 | 1/2012 | Gupta |
| D655,593 S | 3/2012 | Wagner, III et al. |
| 8,214,989 B1 | 7/2012 | Jefferson et al. |
| 8,528,870 B2 | 9/2013 | Liu et al. |
| 8,584,335 B2 | 11/2013 | Tsang et al. |
| 2005/0173853 A1* | 8/2005 | Maes .................... B23D 45/12 269/45 |
| 2011/0284513 A1* | 11/2011 | Rappl ................. B23K 9/0008 219/130.1 |

OTHER PUBLICATIONS

Miller Welds, Photograph, http://www.millerwelds.com/resources/communities/mboard/attachment.php?attachmentid=15427&d=1220455378, (last visited May 8, 2013), Internet web site, date of first publication unknown.

Welding Web, Grasshopper, http://weldingweb.com/showthread.php?t=85651, (last visited May 8, 2013), Internet web site, date of first publication unknown.

\* cited by examiner

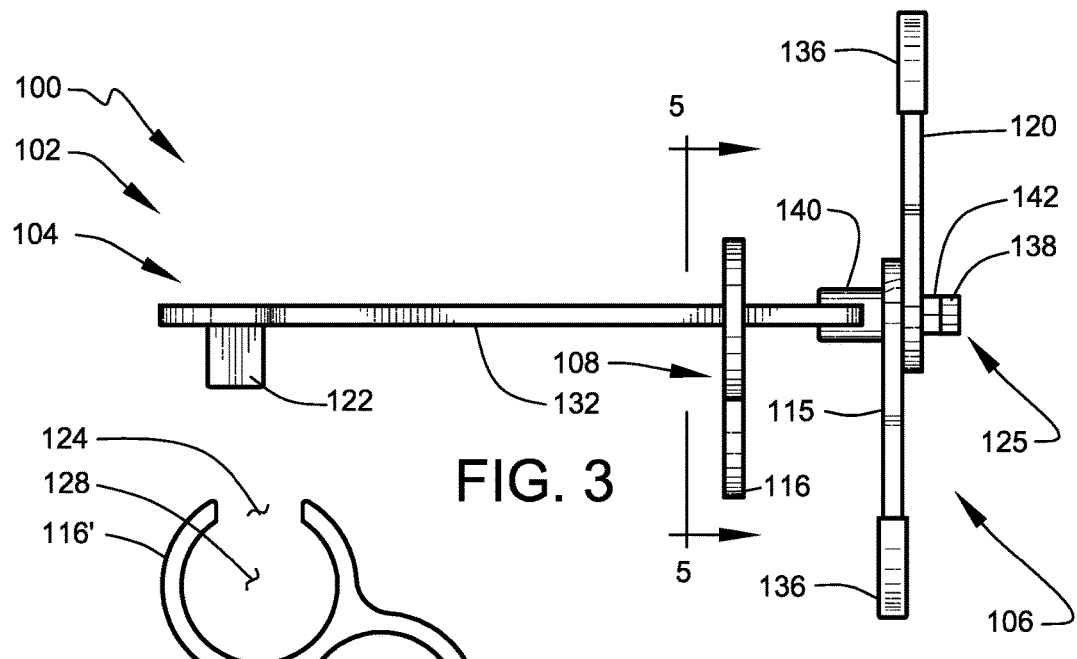
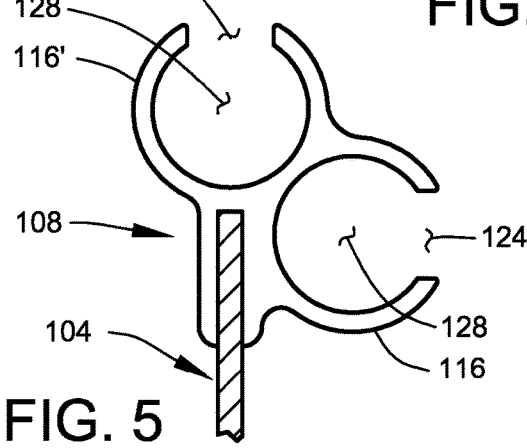
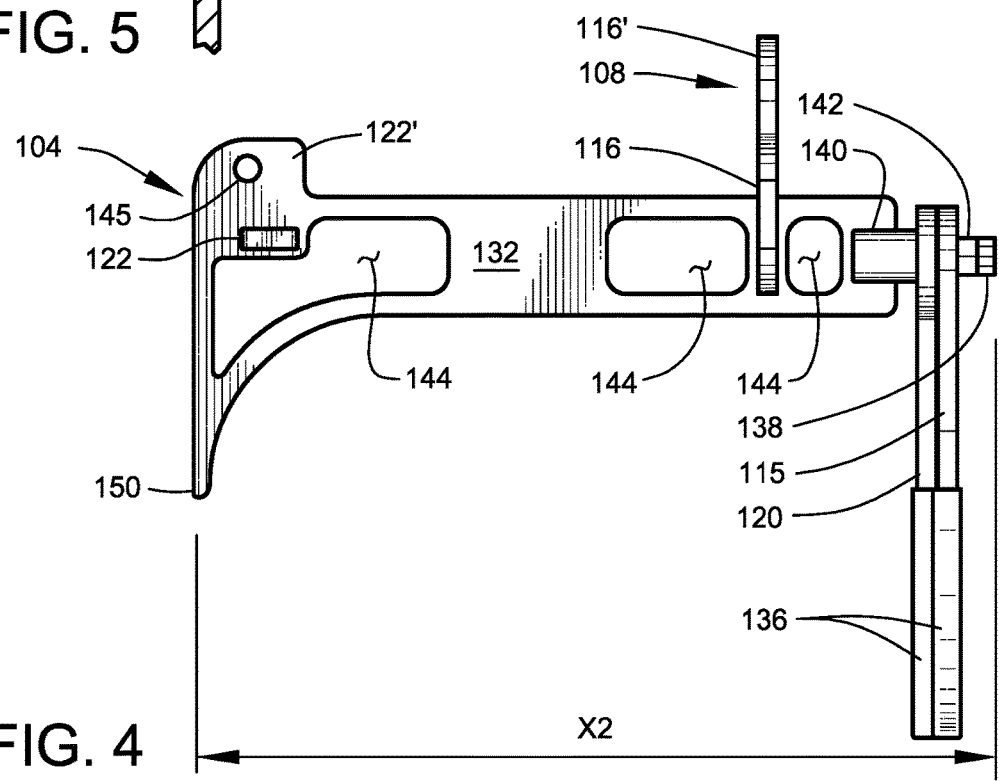
FIG. 3
FIG. 5
FIG. 4

PORTABLE WELDING GROUND CLAMP ATTACHMENT SYSTEMS

CROSS-REFERENCE TO RELATED APPLICATIONS

This application is a continuation of U.S. patent application Ser. No. 14/229,942, filed Mar. 30, 2014, which claims the benefit of U.S. Provisional Patent Application No. 61/807,678, filed Apr. 2, 2013, the contents all of which are incorporated herein by this reference and are not admitted to be prior art with respect to the present invention by the mention in this cross-reference section.

BRIEF DESCRIPTION OF THE DRAWINGS

FIG. 3 shows a top view of the welding ground clamp attachment device of FIG. 1.

FIG. 4 shows a side view of the welding ground clamp attachment device of FIG. 1.

FIG. 5 shows a sectional view through the section 5-5 of FIG. 3.

DETAILED DESCRIPTION

Figure 1:
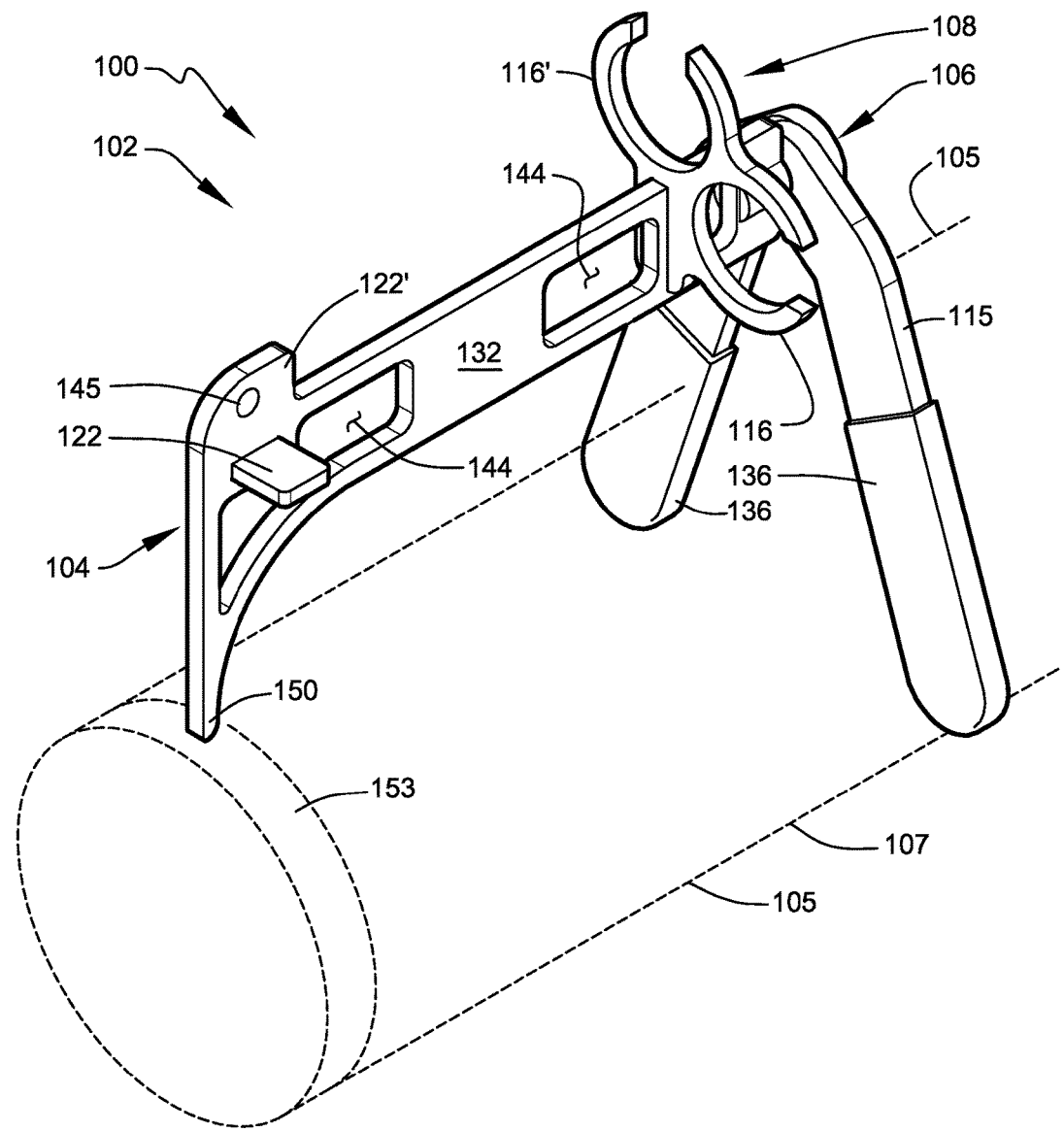
FIG. 1 shows a perspective view of a welding ground clamp attachment device.

The present disclosure relates to portable welding ground clamp attachment systems. The present disclosure further relates to portable welding ground clamp attachment systems used to attach a ground clamp or work cable of an arc welder to a workpiece.

Electric welding processes require that a proper electrically-conductive pathway be established between the workpiece and power source of the welding apparatus. An electric arc-welding apparatus utilizes a pair of electrically-conductive cables to establish a circuit between the workpiece to be welded and a direct current (DC) or alternating current (AC) power source of the welder. In a standard arrangement, one cable extends from the power source to a welding electrode used to generate the high-temperature electric arc producing the weld. A second cable, commonly referred to as a work cable or ground cable, is coupled to the workpiece using a spring loaded or screw-actuated clamp. When the welding apparatus is energized, electric current flows through the welding electrode, across the arc gap, and returns through the work cable after passing through the workpiece. Failure to positively couple the work cable to the workpiece often results in hazardous arcing and resistance heating at the connection point and may produce welds of inferior quality due to a reduced conduction of electric current.

When welding in certain environments, such as in oilfield pipeline installations, it is often difficult to positively engage the work cable on the workpiece, particularly when the work involves the joining of long segments of pipe having smooth, cylindrical, outer surfaces. A lack of work-cable attachment points along the pipe segments makes welding both inconvenient and potentially dangerous. Additionally, pipe used in oil field installations is typically supplied with a non-conductive epoxy coating, which further complicates attachment of a work cable or workpiece clamp. A need clearly exists for an improved system to establish positive connections between a work cable and workpiece, particularly in welding applications where extended lengths of pipe are being joined.

According to an implementation of the present disclosure, a welding ground clamp attachment device is disclosed which is portable and mobile during use and which permits attachment of a welding ground clamp or workpiece clamp to a workpiece, such as a pipe. According to an implementation of the present disclosure, the welding ground clamp attachment device straddles the workpiece. The welding ground clamp attachment device utilizes a magnetic attachment system in another implementation of the present disclosure. The welding ground clamp attachment device also provides welding ground clamp attachment points and associated welding ground clamp handle supports. According to an implementation of the present disclosure, a welding ground clamp attachment device is disclosed comprising at least two welding ground clamp attachment points and at least one welding ground clamp handle support associated with each one of the at least two welding ground clamp attachment points.

Figure 2:
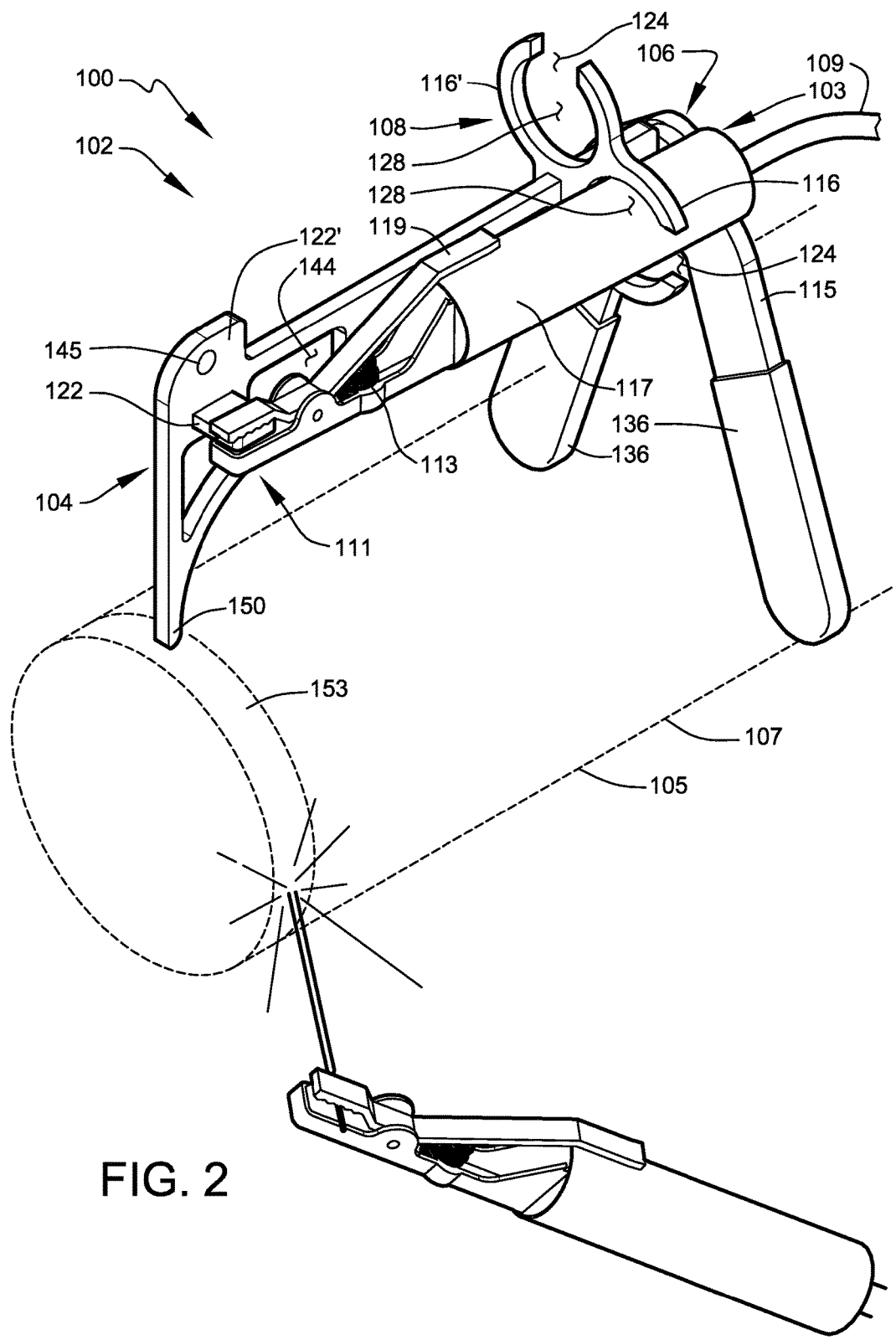
FIG. 2 shows a perspective view illustrating the welding ground clamp attachment device of FIG. 1 configured to electrically couple a welding ground clamp to a workpiece to be welded.

FIG. 1 shows a perspective view of welding ground clamp attachment device 102. FIG. 2 shows a perspective view illustrating welding ground clamp attachment device 102 (also referred to herein as clamp attachment device 102) of FIG. 1 configured to electrically couple a welding ground clamp 103 to workpiece 105. In the present disclosure, the commonly-used terms welding ground clamp, ground clamp, and ground cable may be used interchangeably with the more conventional terminology of work clamp and work cable. Furthermore, in the present disclosure, workpiece 105 most frequently takes the form of a cylindrical pipe or analogous structure. However, it should be noted that the implementations of the present disclosure may be used on other types of workpieces.

As previously noted, the lack of attachment points for ground clamps along certain types of workpieces, such as extended segments of cylindrical pipe, makes the execution of an electric welding process both inconvenient and potentially dangerous. Implementations of the present system, generally identified herein as portable welding ground clamp attachment system 100, are designed to overcome this limitation by providing a convenient connection point for ground clamp 103 and a reliable electrically-conductive pathway connecting ground clamp 103 and workpiece 105 to be welded.

Clamp attachment device 102 is designed to be mobile and manually portable such that the device can be readily moved about the outer circumference of workpiece 105, as needed. Furthermore, clamp attachment device 102 is configured to be adjustable to accommodate workpieces 105 of varying shapes, sizes, and diameters, as further described below.

FIG. 3 shows a top view of clamp attachment device 102. FIG. 4 shows a side view of clamp attachment device 102. Clamp attachment device 102 comprises two principal components generally identified herein as electrically-conductive frame 104 and adjustable workpiece straddling portion 106.

The primary functions of electrically-conductive frame 104 are to provide an electrically-conductive point or region of connection for ground clamp 103, to provide a support for the body of ground clamp 103 when connected, and to provide an electrically-conductive pathway connecting ground clamp 103 and workpiece 105. Workpiece straddling portion 106 functions to adjustably support electrically-conductive frame 104 at a proper operating position and orientation relative to the region of pipe 107 to be welded. As shown, clamp attachment device 102 rests atop the workpiece and is supported by the workpiece.

Referring again to FIG. 2 through FIG. 4, electrically-conductive frame 104 comprises at least one region enabling the connection of ground clamp 103 and at least one arrangement to assist in supporting the body of ground clamp 103 once connected. In this regard, the upper-rear portion of electrically-conductive frame 104 comprises clamp-body holder 108 preferably adapted to hold the body of ground clamp 103 or similar workpiece clamp of an arc welder. As previously noted, ground clamp 103 is customarily fitted to the distal end of a ground cable 109, which functions to conduct electrical current between workpiece 105 and the electric arc-welding apparatus.

According to an implementation of the present disclosure, clamp-body holder 108 comprises a "C-shaped" annular member 116 in which handle 117 of ground clamp 103 is supported, as shown in FIG. 2. A gap segment 124 is preferably provided within a portion of annular member 116 to permit the passage of ground cable 109 as handle 117 is positioned within the circular support aperture 128 of the "C-shaped" annular member 116.

Clamp-body holder 108 may be designed to accommodate a particular type of ground clamp 103 often used in pipeline assembly and repair operations. This type of ground clamp is capable of functioning both as a ground/work clamp and electrode holder; thus, either cable of a welding apparatus, so equipped, may function interchangeably without the need to swap terminal connections at the welding apparatus. One example of such a ground clamp carries the model number T-300 as produced by Lincoln Electric Company of Cleveland, Ohio. The Lincoln-produced ground clamp 103 includes a set of electrically-conductive jaws 111 joined with an elongated cylindrically-shaped handle 117, as shown. The electrically-conductive jaws 111 include a first jaw electrically coupled to ground cable 109 and a second jaw pivotally connected to the first jaw. The second (pivoting) jaw includes a thumb-operated lever 119 to enable manual opening and closing of jaws 111. A spring 113 biases jaws 111 toward a normally-closed position.

Referring to FIG. 2, a first electrically-conductive clamping portion 122 is provided as an engagement point for the spring-loaded jaws 111 of ground clamp 103, as shown. Referring again to both FIG. 1 and FIG. 3, clamping portion 122 comprises a rectangular metal plate projecting outwardly from side portion 132 of conductive frame 104, as shown. The metal plate forming clamping portion 122 is joined with side portion 132 by welding the plate in an orientation normal to the planar face of side portion 132 (see FIG. 1), as shown. The rectangular plate is located in a forward position permitting jaws 111 to firmly engage clamping portion 122 while the adjoining handle 117 is supported within the "C-shaped" annular member 116 of clamp-body holder 108 (see FIG. 2). Thus, at least one electrically-conductive region on which ground clamp 103 may be connected is provided within conductive frame 104.

Figure 6:
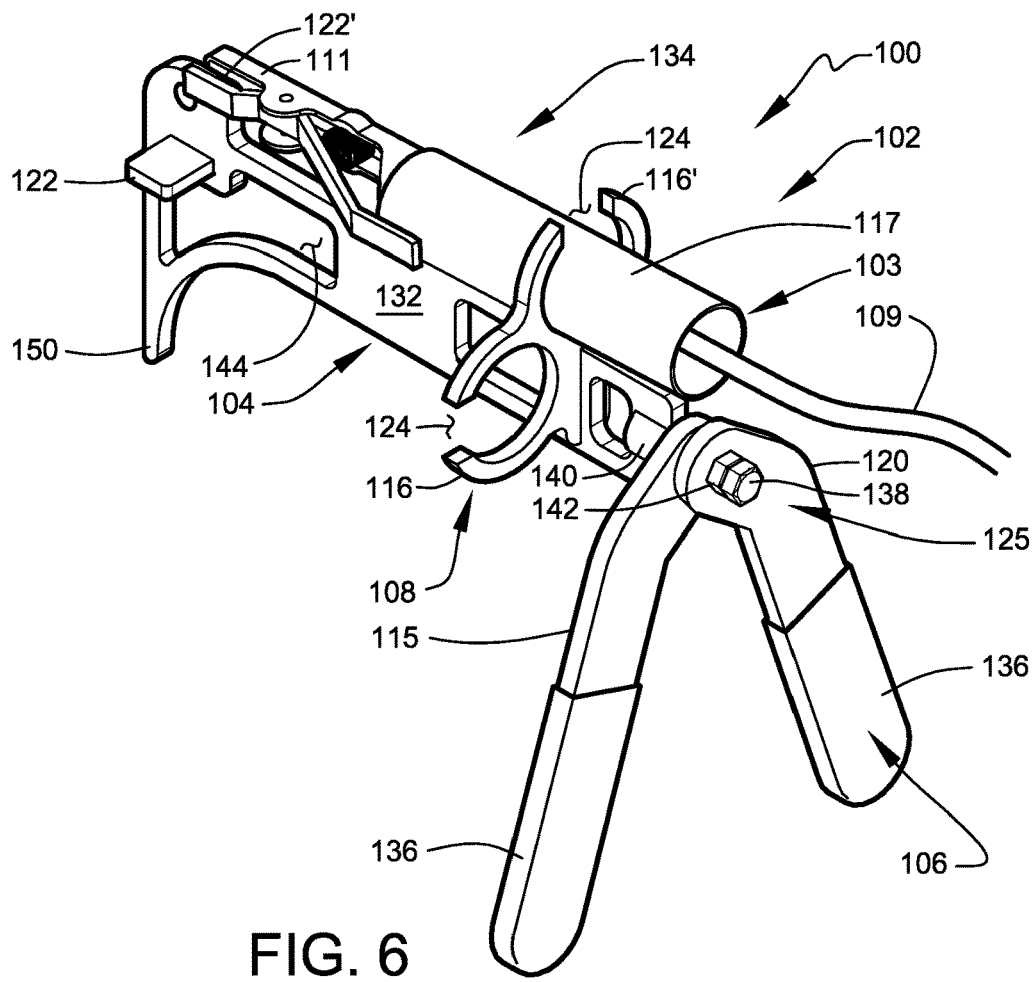
FIG. 6 shows a rear perspective view illustrating the welding ground clamp attachment device of FIG. 1 with the welding ground clamp engaged in an alternate position.

FIG. 5 shows a sectional view through the section 5-5 of FIG. 3. FIG. 6 shows a rear perspective view illustrating clamp attachment device 102 with the welding ground clamp 103 engaged in alternate position 134. According to an implementation of the present disclosure, clamp-body holder 108 has a second "C-shaped" annular member 116' and clamping portion 122' oriented about ninety degrees from both the first "C-shaped" annular member 116 and clamping portion 122. The second clamping portion 122' comprises an upper extension of conductive frame 104, as best shown in FIG. 5. The second "C-shaped" annular member 116' and clamping portion 122' allow ground clamp 103 to be located in alternate position 134, shown in FIG. 6. The presence of both "C-shaped" annular members provides flexibility for the user as clamp attachment device 102 is moved from workpiece to workpiece. In use, one of the "C-shaped" annular members may be preferred over the other depending on the preference of the user. Moreover, the double support arrangement afforded by clamp-body holder 108 enables simultaneous mounting of two ground clamps 103 coupled independently to two separate electric arc-welding apparatus. This makes "brother-in-law" welding on large-diameter pipe possible by allowing two welders to work concurrently by grounding to the same clamp attachment device 102. It should be noted that under appropriate circumstances other numbers of "C-shaped" annular members, for example, three or more "C-shaped" annular members, may suffice.

Figure 7:
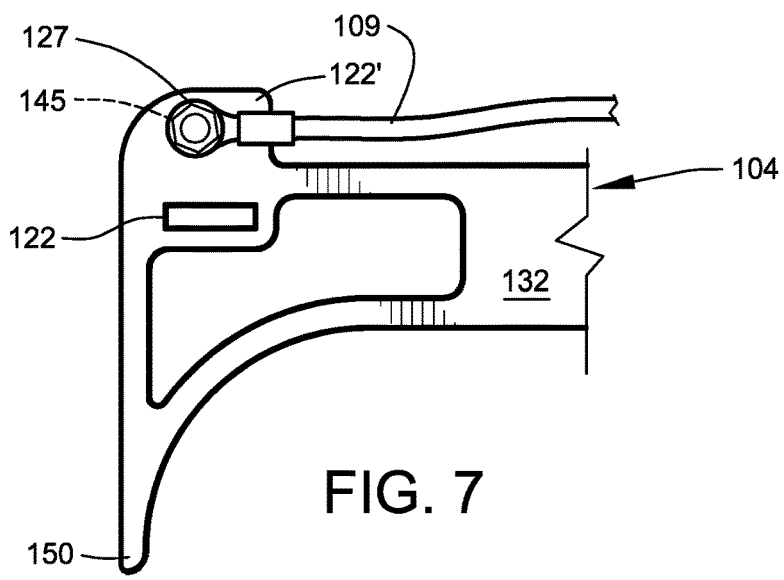
FIG. 7 shows a partial side view illustrating a grounding lug joined with the welding ground clamp attachment device of FIG. 1.

FIG. 7 shows a partial side view illustrating grounding lug 127 of ground cable 109 directly joined with clamp attachment device 102 of FIG. 1. In some welding applications, it is preferred that ground cable 109 be joined directly with clamp attachment device 102. To facilitate this alternate arrangement, clamp attachment device 102 is preferably equipped with aperture 145 permitting direct bolted attachment of grounding lug 127 in the event that a grounding clamp or workpiece clamp is not used.

Clamp attachment device 102 comprises workpiece contact tip 150, as shown. When clamp attachment device 102 is placed on workpiece 105 (by resting clamp attachment device 102 atop th workpiece as shown) workpiece contact tip 150 is positioned to contact a bare-metal portion 153 of workpiece 105 (see FIGS. 1 and 2). With ground clamp 103 or other workpiece clamp attached, as shown in FIG. 2 and FIG. 6, proper grounding and/or workpiece clamp attachment is achieved for safety and for proper welding protocol. If workpiece 105 is an oil field pipe, workpiece contact tip 150 contacts the electrically-conductive metal part of the pipe, which often comprises abutting pipe end portions of two pipe segments to be joined.

Typically, the majority of the length of an oil field pipe is coated with an epoxy material electrically insulating the metal portion of the pipe. However, the non-coated portions (i.e., bare-metal portion 153) of oil field pipe are found at the ends of the pipe where the welding occurs. In preferred use, a user places workpiece contact tip 150 of clamp attachment device 102 in contact with the exposed (electrically-conductive) end of the pipe and attaches ground clamp 103 or workpiece clamp to clamp attachment device 102, as noted above. The shape of workpiece contact tip 150 enables the device to rest within the "V"-shaped groove of bare-metal portion 153 that is customarily present at the weld line between two abutting segments of pipe. When installed, clamp attachment device 102 provides a reliable electrically-conductive pathway coupling ground clamp 103 and workpiece 105.

When generating circumferential welds in pipe and analogous structures, it is often necessary to periodically move or rotate the workpiece relative to a work stand or other support structure. This permits a weld to be applied along areas previously used as an electrical conduction point for workpiece contact tip 150. As the pipeline is made, clamp attachment device 102 may be moved to the next end of the pipe and welding may continue. To facilitate movement of the device, conductive frame 104 preferably comprises one or more apertures 144, as shown. Apertures 144 may be used to assist in gripping the device. In addition, apertures 144 allow clamp attachment device 102 to be lighter in weight whereby a balance between conductive contact at tip 150 and portability of the overall device is achieved.

Figure 8:
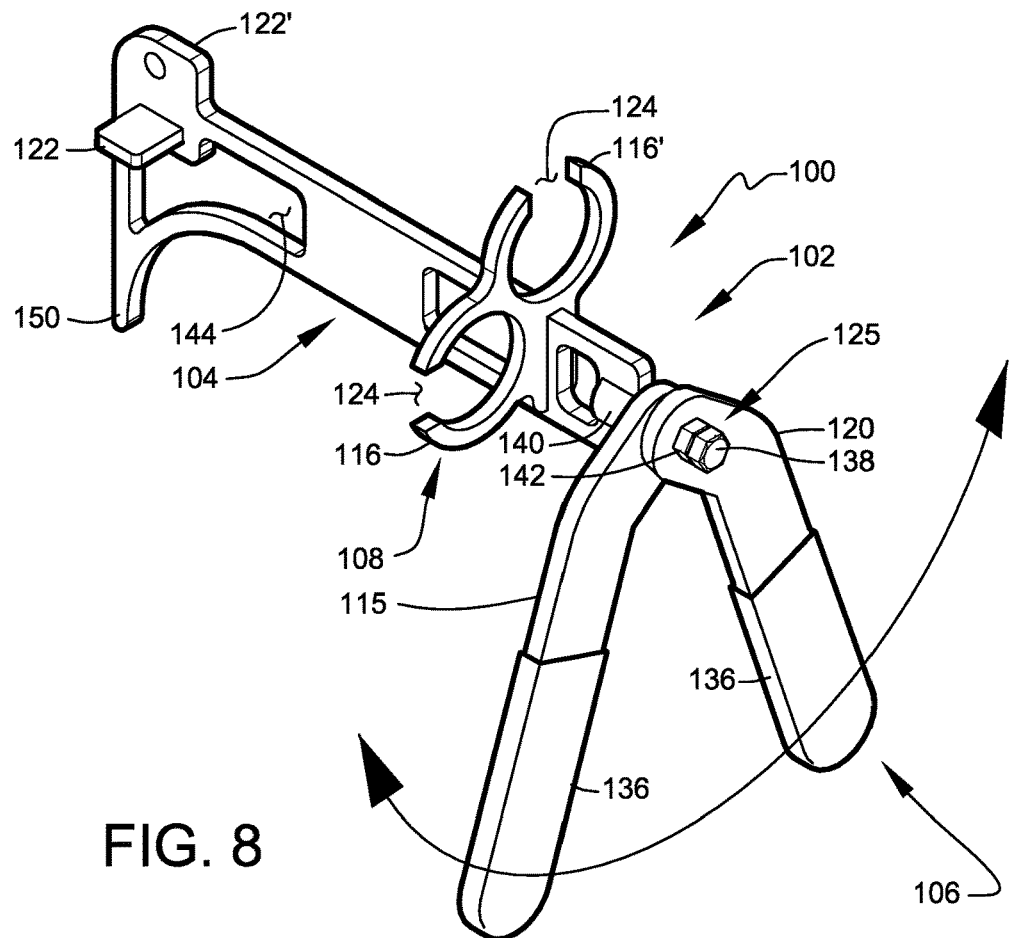
FIG. 8 shows a rear perspective view illustrating an adjustment feature of the welding ground clamp attachment device of FIG. 1 permitting the welding ground clamp attachment device to straddle workpieces of varying sizes.

FIG. 8 shows a rear perspective view illustrating an adjustment feature of clamp attachment device 102 permitting the clamp attachment device to straddle workpieces of varying sizes. Workpiece straddling portion 106 permits clamp attachment device 102 to accommodate workpieces 105 of varying sizes. Workpiece straddling portion 106 preferably functions to support electrically-conductive frame 104 at a proper operating position adjacent the region of pipe 107 to be welded. Workpiece straddling portion 106 comprises two legs (identified herein as leg 115 and leg 120), which are adjustable to fit the workpiece upon which clamp attachment device 102 is placed during welding. Each leg may comprise an insulative cover 136, as shown. Insulative cover 136 may be composed of a non-conductive material such as rubber. The rubber material forming insulative cover 136 may be slip-fit onto the legs, as shown. The rubber material covers the legs and contacts workpiece 105 when clamp attachment device 102 is placed onto workpiece 105.

According to an implementation of the present disclosure, workpiece straddling portion 106 comprises leg-locking assembly 125, as shown. According to an implementation of the present disclosure, leg-locking assembly 125 preferably comprises a position-fixing bolt 138 which spans apertures in the legs and connects with a threaded collar 140 on the opposite end of the leg apertures. Threaded collar 140 is preferably connected to conductive frame 104, preferably by welding. A locking nut 142, which can be tightened and loosened, is threadably engaged on the shaft of the bolt assembly in an intermediate position that is accessible by a user. Once an optimal amount of leg straddling is achieved, bolt 138 and locking nut 142 are tightened to temporarily lock leg 115 and leg 120 at a selected angular position. The nut and bolt are loosened to collapse the legs for transport and/or storage.

Figure 9:
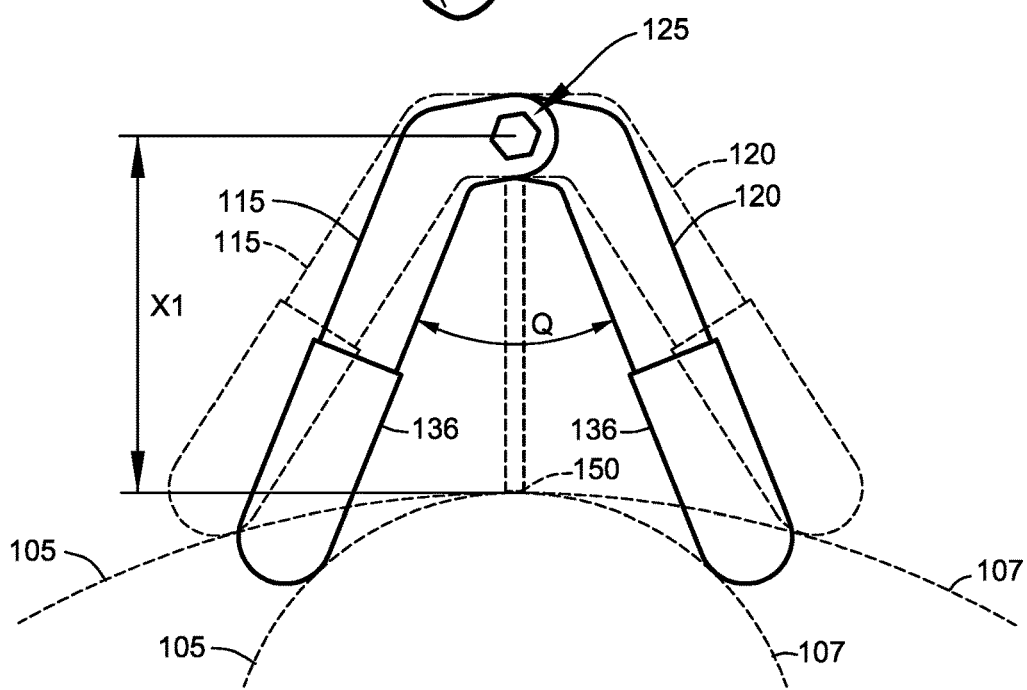
FIG. 9 shows a diagrammatic rear view illustrating representative adjustments of the welding ground clamp attachment device permitting the device to accommodate workpieces of varying sizes.

FIG. 9 shows a diagrammatic rear view illustrating representative adjustments of workpiece straddling portion 106 permitting welding ground clamp attachment device 102 to accommodate workpieces 105 of varying sizes, shapes, and diameters. By adjusting the angle Q between leg 115 and leg 120, a selected distance X1 can be maintained regardless of the diameter of the workpiece 105 on which clamp attachment device 102 is placed. This permits the user to optimize the relationship between the contact point of tip 150, contact points of the legs, and angular position of conductive frame 104 relative to the longitudinal surface of pipe 107. In this manner, the amount of apparatus weight transferred to tip 150 can be adjusted or maintained to provide a reliable electrically-conductive connection between conductive frame 104 and workpiece 105.

Except as may be noted above, clamp attachment device 102 is constructed from durable electrically-conductive materials, preferably metallic materials, most preferably steel. Conductive frame 104, clamp-body holder 108, clamping portion 122, leg 115, and leg 120 may be cut from a sheet of steel, preferably using a computer numerical control (CNC) cutting device. Apart from the threaded connections of leg-locking assembly 125, the steel components of clamp attachment device 102 may be assembled by welding. A protective coating may be applied to the steel members except at areas forming electrically-conductive connections.

According to an implementation of the present disclosure, clamp attachment device 102 may comprise a length X2 (see FIG. 4) of about 12 inches. It should be noted, however, that the size and scale of the implementations of the present system may be modified to match the requirements of their intended use without deviating from the scope of the present system.

Figure 10:
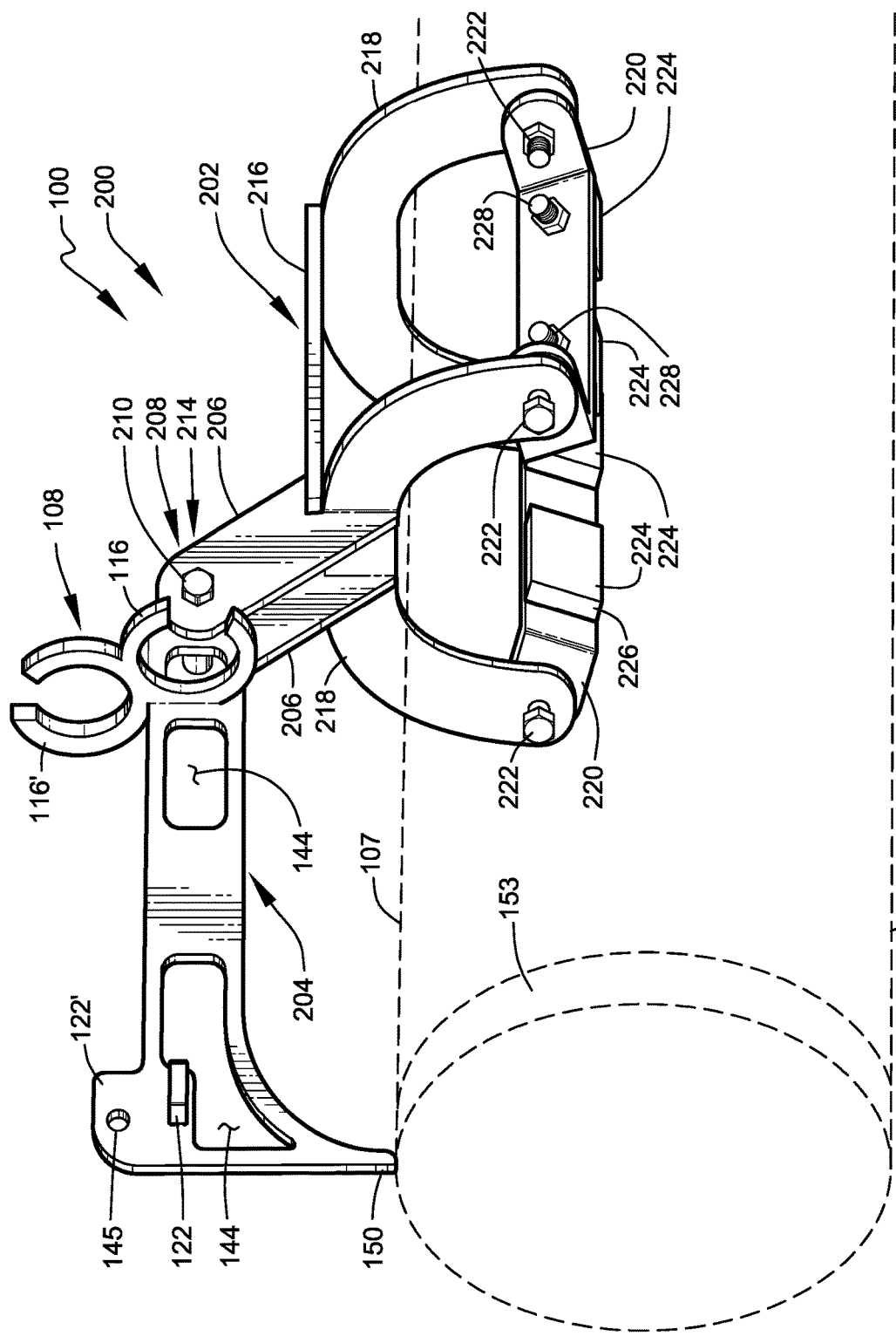
FIG. 10 shows a perspective view illustrating a welding ground clamp attachment device utilizing a magnetic mounting arrangement.
Figure 11:
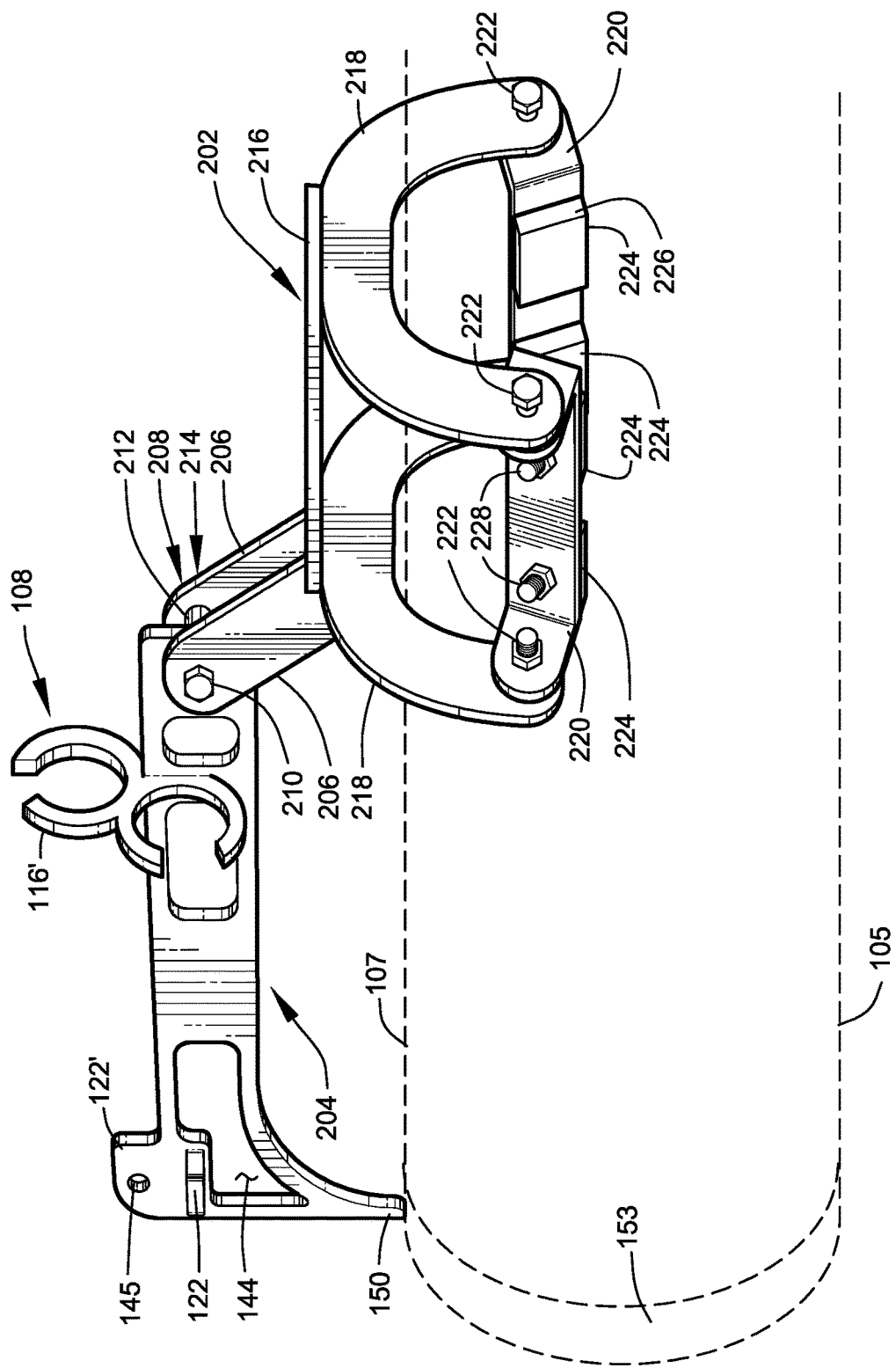
FIG. 11 shows a rear perspective view further illustrating arrangements of the welding ground clamp attachment device of FIG. 10.

FIG. 10 shows a perspective view, illustrating clamp attachment device 200 utilizing a magnetic attachment base 202. FIG. 11 shows a rear perspective view further illustrating arrangements of clamp attachment device 200. Referring to FIG. 10 and FIG. 11, clamp attachment device 200 comprises conductive frame 204 and magnetic attachment base 202, as shown. It is noted that conductive frame 204 of clamp attachment device 200 comprises physical arrangements substantially similar to the conductive frame 104 of the that shown in FIG. 1; thus, only the differences between clamp attachment device 200 and clamp attachment device 102 will be elaborated upon in the following description.

Unlike the prior described implementation of portable welding ground clamp attachment system 100, clamp attachment device 200 utilizes a set of permanent magnets 224 to removably adhere the device to a ferromagnetic workpiece 105. This feature allows quick and simple placement and removal of clamp attachment device 200.

Figure 12:
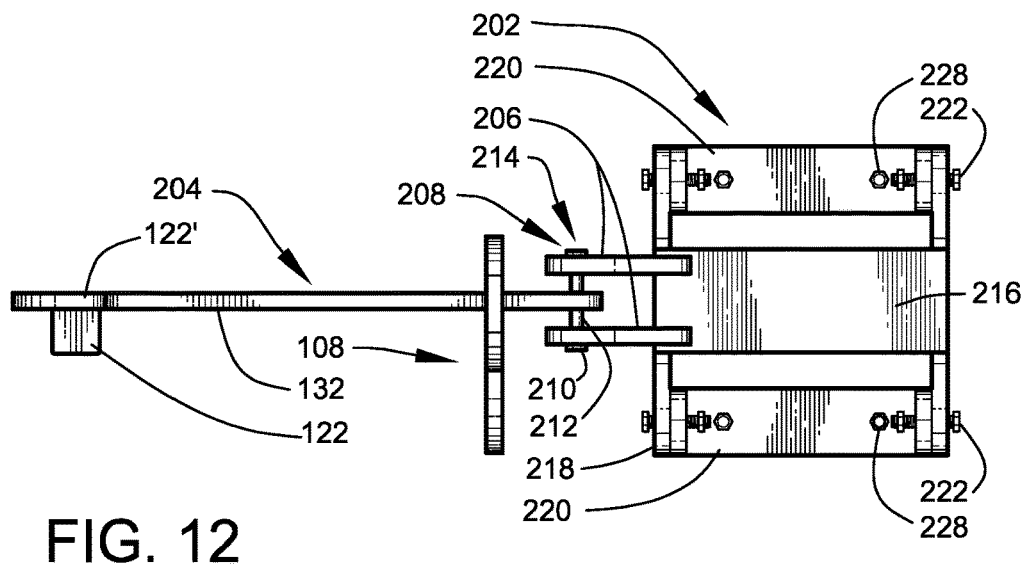
FIG. 12 shows a top view of the welding ground clamp attachment device of FIG. 10.
Figure 13:
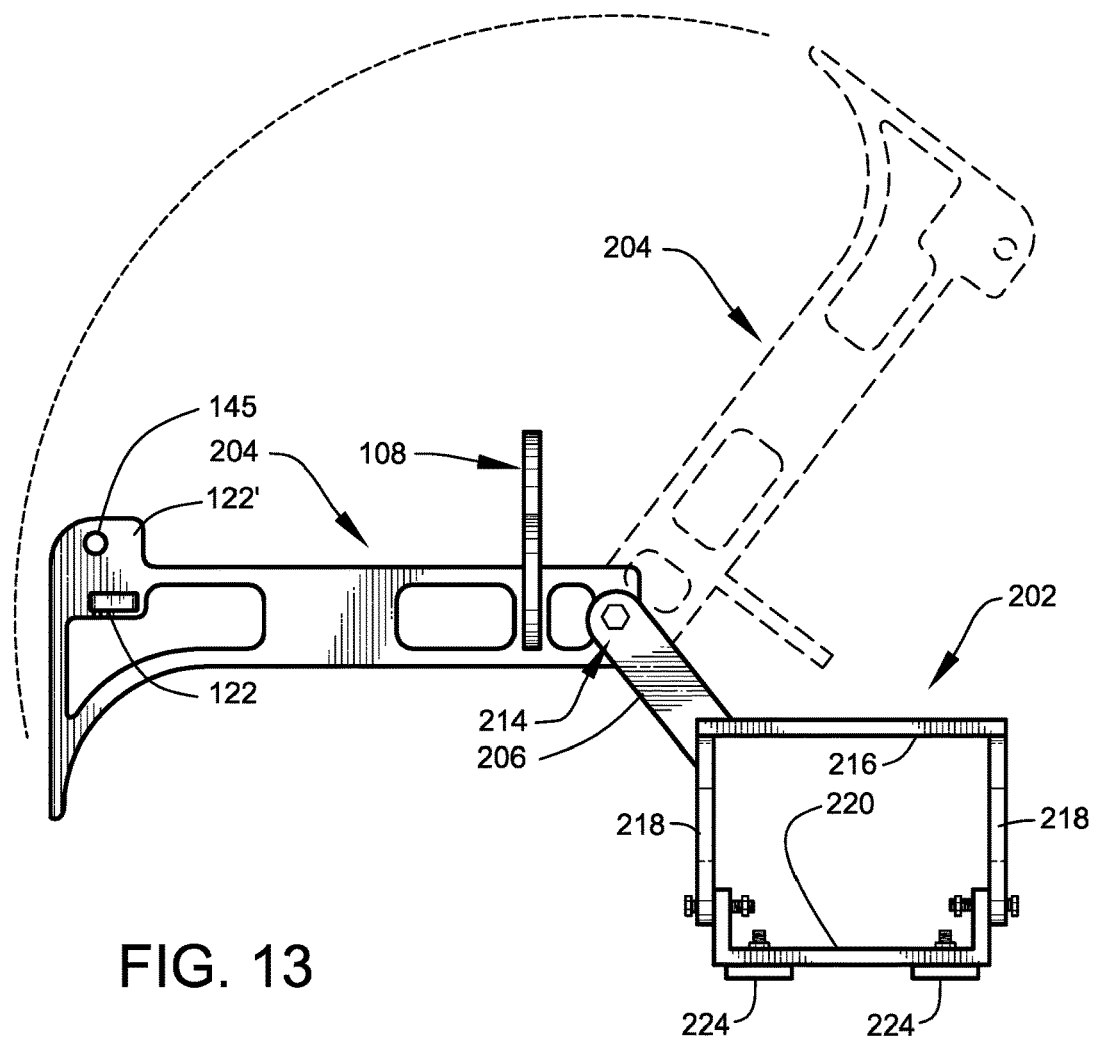
FIG. 13 shows a side view illustrating features of the welding ground clamp attachment device of FIG. 10.

FIG. 12 shows a top view, illustrating clamp attachment device 200 of FIG. 10. FIG. 13 shows a side view further illustrating features of clamp attachment device 200 of FIG. 10. Magnetic attachment base 202 comprises a pair of spaced-apart support members 206 on which conductive frame 204 is pivotally mounted. Pivot assembly 208 of conductive frame 204 consists of threaded fastener 210 extending through both support members 206 and conductive frame 204, as shown. A set of spacers 212 are located between support members 206 and on each side of conductive frame 204, as shown. This arrangement allows conductive frame 204 to pivot about threaded fastener 210 without excessive side-to-side translation. To reduce the potential for unwanted electrical arcing at magnetic attachment base 202, implementations of the present system electrically isolate conductive frame 204 from magnetic attachment base 202. In this regard, pivot assembly 208 of implementations of the present disclosure utilizes an electrically non-conductive arrangement of sleeves and isolators 214 at threaded fastener 210.

In use, conductive frame 204 can be swiveled upwardly away from the ferromagnetic workpiece 105 without moving magnetic attachment base 202 from the pipe. This feature provides the user convenient access to the region of ferromagnetic workpiece 105 in contact with workpiece contact tip 150 allowing required procedures such as, for example, buffing and grinding to be performed.

Support members 206 extend downwardly to intersect a centrally-located cross plate 216 and one of two "U-shaped" leg members 218 located below respective ends of cross plate 216, as shown. Alternately, each end of cross plate 216 can be bent downwardly to form the leg members. Two magnet support brackets 220, of a bent-plate configuration, are pivotally joined to the base portions of leg members 218 using threaded fasteners 222, as shown. Each magnet support bracket 220 extends longitudinally from the base of a forward leg member 218 to the base of a trailing leg member 218, as shown.

Each magnet support bracket 220 preferably supports two permanent magnets 224, as shown. However, other numbers of magnets may suffice. Each permanent magnet 224 is bonded or otherwise firmly coupled to steel cup 226. Each steel cup 226 is coupled to a respective magnet support bracket 220 using threaded fasteners 228, as shown. Each steel cup 226 is electrically isolated from magnet support bracket 220 using non-conductive washers to further reduce the potential for arcing and resistive heating at the points of contact with the ferromagnetic workpiece 105.

Figure 14:
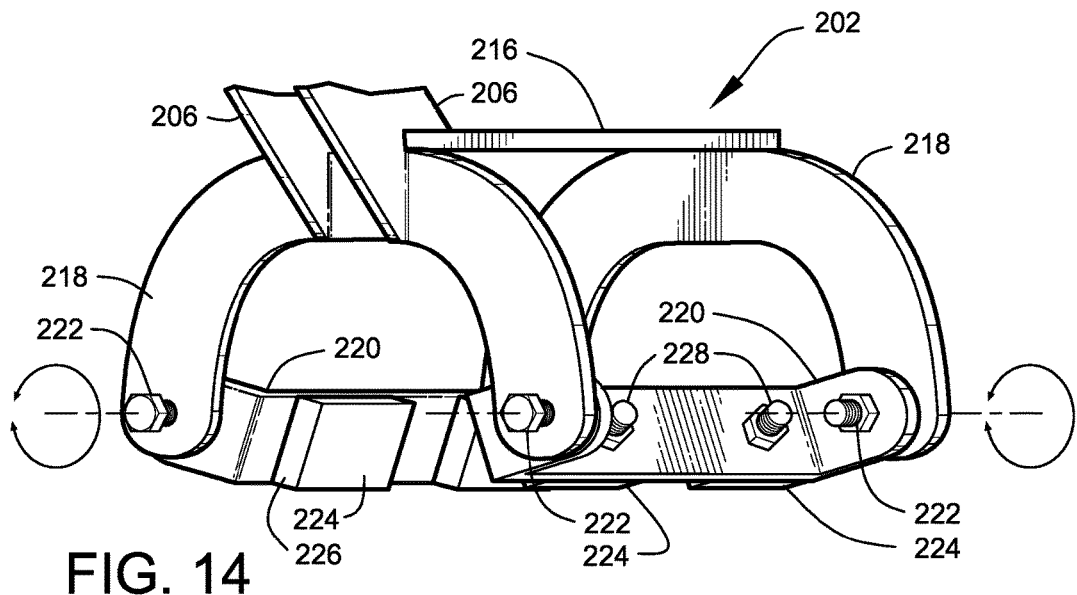
FIG. 14 shows a partial perspective view illustrating an adjustment feature of the welding ground clamp attachment device of FIG. 10 permitting the device to accommodate workpieces of varying sizes.
Figure 15:
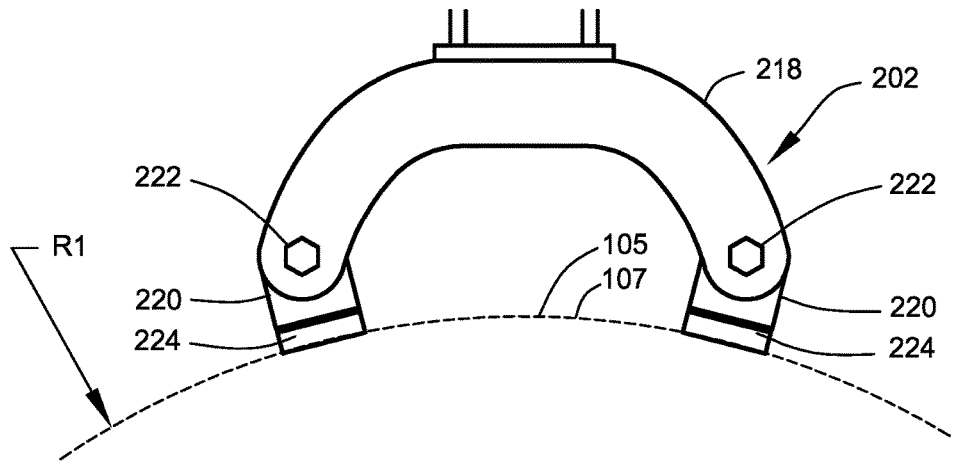
FIG. 15 shows a diagrammatic rear view illustrating the welding ground clamp attachment device of FIG. 10 magnetically coupled to a workpiece having a first diameter.

FIG. 14 shows a partial perspective view illustrating an adjustment feature of clamp attachment device 200 which permits the device to accommodate ferromagnetic workpieces 105 of varying sizes, shapes, and diameters. FIG. 15 shows a diagrammatic rear view, illustrating clamp attachment device 200 magnetically coupled to a first ferromagnetic workpiece 105 having a first diameter R1. Referring to FIG. 14 and FIG. 15, each magnet support bracket 220 is capable of swiveling about threaded fasteners 222. The ability of each magnet support bracket 220 to pivot relative to leg members 218 enables the angles of the planar contact surfaces 230 of permanent magnets 224 to form a "best fit" engagement with the cylindrical outer circumference of the ferromagnetic workpiece 105. In this way, magnetic contact between permanent magnets 224 and the ferromagnetic workpiece 105 is maximized.

Figure 16:
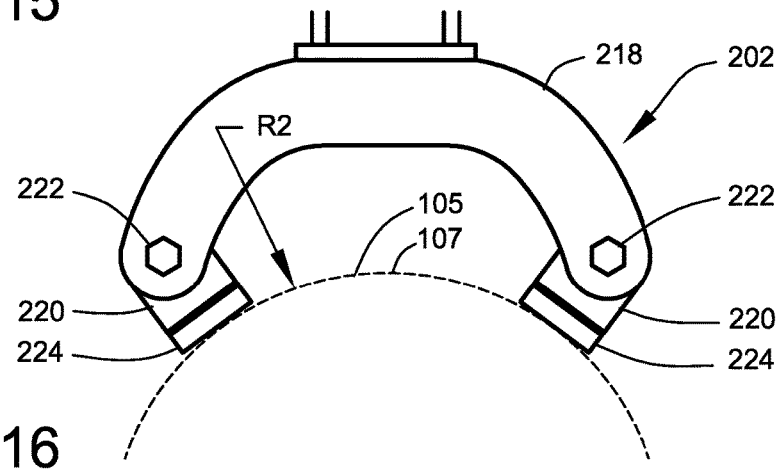
FIG. 16 shows another diagrammatic rear view illustrating the welding ground clamp attachment device of FIG. 10 magnetically coupled to a second workpiece having a smaller diameter than the workpiece shown in FIG. 15.

FIG. 16 shows another diagrammatic rear view illustrating clamp attachment device 200 magnetically coupled to a second workpiece 105 having a diameter R2 smaller than diameter R1, as shown. Magnet support brackets 220 are shown adjusted to place the angles of the planar contact surfaces 230 of permanent magnets 224 in a new "best fit" engagement with the smaller cylindrical outer circumference of the second ferromagnetic workpiece 105. Preferably, magnet support brackets 220 are free to pivot allowing the angular adjustments to permanent magnets 224 to occur automatically; however, the magnet support brackets 220 may be fixed at selected angles by tightening threaded fasteners 228, if required.

Except as noted above, clamp attachment device 200 may be constructed from durable electrically-conductive materials, which may be metallic materials, which may further be steel. According to an implementation of the present disclosure, conductive frame 204, support members 206, cross plate 216, leg members 218, and magnet support brackets 220 are cut from a sheet of steel, preferably using a computer numerical control (CNC) cutting device. Apart from the above-noted threaded connections, the steel components of alternate clamp attachment device 200 may be assembled by welding. A protective coating may be applied to the steel members, with the exception of areas forming electrically-conductive connections with the work clamps and workpiece.

Different preferred embodiments, methods, applications, advantages, and features of this invention have been described above; however, these particular embodiments, methods, applications, advantages, and features should not be construed as being the only ones that constitute the practice of the invention. Indeed, it is understood that the broadest scope of this invention includes many uses and design variations. Further, other embodiments of present invention will be apparent to those skilled in the art given the benefit of this disclosure and the below claims.

What is claimed is:

1. An apparatus comprising: a welding ground attachment device to temporarily position and secure a welding ground of a welding device near a pipe being welded, the welding ground comprising a clamping portion and a handle portion, said welding ground attachment device structured and arranged to be positioned and placed onto a pipe and supported by the pipe by resting atop the pipe; said welding ground attachment device is supported by the pipe workpiece with structure comprising a first pipe contacting portion that contacts the pipe and a second pipe contacting portion that contacts the pipe a distance away from said first pipe contacting portion, and a connecting member that connects said second pipe contacting portion with said first pipe contacting portion, and said connecting member is elevated above the pipe when said welding ground attachment device is supported by the pipe; said first pipe contacting portion comprises two pivotally connected leg members that straddle the pipe when said welding ground attachment device rests atop the pipe; said pivotally connected leg members are adjustable to accommodate pipes of varying circumferences; said second pipe contacting portion comprising an upper end and a lower end, and said lower end of said second pipe contacting portion transitions to a tip that contacts the pipe when said welding around attachment device rests atop the pipe; said welding ground attachment device comprises at least two welding ground attachment points, said upper end of said second pipe contacting portion comprising a first of said at least two welding ground attachment points and a second of said at least two welding ground attachment points comprising a plate arranged in an orthogonal orientation to said first of said at least two welding ground attachment points, and said connecting member comprises at least two welding ground handle supports, and a first of said at least two welding ground handle supports and said upper end of said second pipe contact portion are in an alignment permitting a user to clamp the clamping portion of a welding ground to said upper end of said second pipe contact portion and insert the handle of the welding ground into said first of said at least two welding ground handle supports, and a second of said at least two welding ground handle supports and said plate are in an alignment permitting a user to alternatively clamp the clamping portion of a welding ground to said plate and insert the handle of the welding ground into said second of said welding ground clamp handle supports to assist pipe welding activities.

2. The apparatus of claim 1 further comprising a leg locking assembly to temporarily lock position of said two pivotally connected leg members.

3. The apparatus of claim 1 wherein each of said leg members comprises an insulative cover.

4. The apparatus of claim 1 wherein said welding ground attachment device comprises one or more apertures assisting gripping by a user for transport of said welding ground attachment device and to make said welding ground attachment device lighter in weight.

\* \* \* \* \*